United States Patent
Lau et al.

(10) Patent No.: US 10,133,472 B2
(45) Date of Patent: Nov. 20, 2018

(54) GESTURE BASED VIDEO CLIPPING CONTROL

(71) Applicant: Disney Enterprises, Inc., Burbank, CA (US)

(72) Inventors: Ching Lau, Burbank, CA (US); Michael O'Brien, Burbank, CA (US); Sce Pike, Burbank, CA (US); Jiancheng Ma, Burbank, CA (US); Jeremy Marusek, Burbank, CA (US); Quinn Simpson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 710 days.

(21) Appl. No.: 13/841,335

(22) Filed: Mar. 15, 2013

(65) Prior Publication Data

US 2014/0282001 A1      Sep. 18, 2014

(51) Int. Cl.
G06F 3/0488 (2013.01)
G06F 17/30 (2006.01)

(52) U.S. Cl.
CPC ...... *G06F 3/0488* (2013.01); *G06F 17/30852* (2013.01)

(58) Field of Classification Search
CPC .................................................. G06F 3/0488
See application file for complete search history.

(56) References Cited

U.S. PATENT DOCUMENTS 6,600,874 B1 * 7/2003 Fujita .................... G11B 20/10
                                                                    386/249
2002/0141501 A1* 10/2002 Krishnamachari ....... G06T 3/40
                                                                    375/240.18
2010/0214237 A1* 8/2010 Echeverri ........... G06F 3/04883
                                                                    345/173
2010/0235794 A1* 9/2010 Ording .................. G06F 3/0485
                                                                    715/863
2012/0096357 A1* 4/2012 Folgner .................. G11B 27/34
                                                                    715/726
2013/0106914 A1* 5/2013 Jain ....................... G06F 3/0482
                                                                    345/666
2013/0185638 A1* 7/2013 Tischer ................. G06F 3/0484
                                                                    715/719

(Continued)

FOREIGN PATENT DOCUMENTS

EP              2341413 A1 * 7/2011 ......... G06F 3/03547

*Primary Examiner* — Kevin L Young
*Assistant Examiner* — Parmanand D Patel
(74) *Attorney, Agent, or Firm* — Patterson + Sheridan, LLP

(57) ABSTRACT

System, method, and computer program product to generate a clip of a media file on a device having a touch input component, the media file comprising a plurality of segments, by outputting for display a first segment of the media file, responsive to receiving: (i) input indicating to generate the clip of the media file using the first segment, and (ii) a first swipe gesture on the touch input component: identifying a subset of segments, of the plurality, based on a direction of the first swipe gesture, the first subset of segments including a destination segment, and outputting for display each of the subset of segments, and responsive to receiving input selecting the destination segment as part of the clip of the media file, generating the clip of the media file, the media clip including each segment of the media file between the first and the destination segment.

27 Claims, 6 Drawing Sheets

(56) References Cited

U.S. PATENT DOCUMENTS

| | | | |
|---|---|---|---|
| 2013/0290845 A1* | 10/2013 | Rudman | G11B 27/034 715/716 |
| 2013/0307792 A1* | 11/2013 | Andres | G11B 27/005 345/173 |
| 2014/0306897 A1* | 10/2014 | Cueto | 345/173 |
| 2015/0256763 A1* | 9/2015 | Niemi | G06F 3/0485 348/700 |

* cited by examiner

GESTURE BASED VIDEO CLIPPING CONTROL

BACKGROUND

Field of the Invention

Embodiments disclosed herein relate to the field of computer software. More specifically, embodiments disclosed herein relate to computer software which provides gesture based video clipping control.

Description of the Related Art

Traditional button-based video controls were created for hardware devices, such as a DVD player or VCR. These controls were ported directly to computers and mobile computing devices. However, small buttons used to fast forward, rewind, record, and play videos do not work very well on mobile devices. Therefore, there is a need for an easy way to create a video clip from live or pre-recorded video content.

SUMMARY

Embodiments disclosed herein provide a system, method, and computer program product to generate a clip of a selected media file on a device having a touch input component, the selected media file comprising a plurality of segments, by outputting for display a first segment of the selected media file, responsive to receiving: (i) input indicating to generate the clip of the selected media file using the first segment, and (ii) a first swipe gesture on the touch input component: identifying a first subset of segments, of the plurality of segments, based on a direction of the first swipe gesture, wherein the first subset of segments includes a destination segment, and outputting for display each of the first subset of segments, and responsive to receiving input selecting the destination segment as part of the clip of the selected media file, generating the clip of the selected media file, wherein the media clip includes each segment of the selected media file between the first segment and the destination segment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
FIGS. 1A-1C are schematics illustrating gesture based video clipping control, according to one embodiment disclosed herein.

Embodiments disclosed herein provide gesture based content controls that take human factors into account and leverage sensors (such as eye trackers) in computing devices to provide an intuitive way to allow users to navigate such as rewind, fast forward, and play videos, as well as create video clips from live or video on demand (VOD) content.

Generally, when a user selects a video, either a first frame of the video is displayed to the user or the video starts playing on the computing device. The user may then click on an icon which triggers the generation of a video clip from the video. The user may then use one, two, or three fingers to swipe the video control to fast forward or rewind the video. When the user swipes on the video control, the video control displays a selection of video frames, displayed at intervals based on the number of fingers used. If one finger is used to swipe, a first interval, such as four seconds may be used. Therefore, video frames from four second intervals in the video may be displayed in sequence to mimic a traditional "fast forward" (or "rewind") through the video. If two fingers are used to swipe, a second interval may be used to scroll through the video. The second interval may be greater than the first interval, such as six or eight seconds. Therefore, video frames from each six or eight second interval may be displayed in sequence for an even faster "fast forward" (or "rewind"). If the user uses three fingers to swipe, the last (or first frame) in the video will be played, depending on the direction the user swipes. If the video is available on the computing device, the video control can extract the video frame from the video. If the video is situated in a remote server, the video control can download the video frames from the remote server.

A destination frame may be calculated based on the velocity of the swipe and how many fingers the user uses to swipe, to provide an endpoint for a rewind or fast forward triggered by the user's swipe gesture. Additionally, a subset of video frames may be defined, which occur at the specified intervals between the first video frame and the destination video frame. The subset of images may be rapidly displayed to mimic the traditional rewind or fast forward effect. When the destination frame is near, the display of the frames may decelerate to provide a smoother experience. Once the destination frame is reached, the video control will display the destination frame in high resolution or continue to play the video starting from the destination frame. There is a trigger for a user to start the generation of video clip from the video. The trigger can be in a form of a UI control (such as button) or another gesture (such as tapping on the video control). The current video frame when the user pulls the trigger is the start of the video clip. The user may swipe the video control to fast forward or rewind the video and select the destination frame as the endpoint of the video clip (or starting point, if the user swiped in a rewind direction). Alternatively, the user may continue to swipe through the video clip in order to find a suitable destination frame to complete the video clip. Once the start and endpoints of the video clip are defined, a request may be sent to a server to generate a video clip using the start and endpoints. The user may then watch the clip and share it with others through a variety of means.

Although videos are used to discuss embodiments disclosed herein, embodiments of the disclosure are not limited to videos. For example, embodiments disclosed herein contemplate any type of media, including audio files, text files, and e-book files. For example, a user may use utilize the scrolling techniques described herein to create snippets of an e-book. The use of videos herein is exemplary, and should not be considered limiting of the disclosure.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the clipping application could execute on a computing system in the cloud and create video clips for users. In such a case, the clipping application could create a custom video clip based on user selected start and endpoints, and store the generated video clip at a storage location in the cloud. Doing so allows a user to access this information from any computing system attached to a network connected to the cloud (e.g., the Internet).

Embodiments of the disclosure may be discussed using computing devices having a touch screen display (such as smartphones, tablets, portable gaming consoles, and the like) as a reference example. However, embodiments of the disclosure contemplate other devices capable of receiving user input to navigate through content, as well as generate clips of the content. Therefore, while direct contact on a touch input component, such as a touch screen display is used as a reference example, other non-contact input is contemplated by embodiments of the disclosure. For example, a camera may be used to capture input gestures (such as hand gestures) made by a user to navigate through the content and generate clips of the content without requiring direct contact from the user. Generally, any device capable of detecting gestures corresponding to user input is contemplated by embodiments of the disclosure.

FIG. 1A is a schematic 100 illustrating gesture based video clipping control, according to one embodiment disclosed herein. As shown, a current video frame (or segment) is displayed to a user through the display of a touch screen device. The current video frame may be part of a video stream, for example, an entire television show, or may be part of a limited subset of images extracted from the television show. The displayed image is in high resolution, and may be the latest frame in a live television show, or the first frame in a stored VOD file. An icon 101 allows a user to begin the process of creating a clip by touching the icon 101. A progress indicator 105 marks a progress of the currently displayed frame in the context of the entire program. A current time 106 displays the current time to the user. For example, the currently displayed frame occurs at zero minutes and thirty-two seconds in the television show. A total time indicator 107 displays a total time of the television show, which in this example is 59 minutes and 53 seconds long. Once the user selects the television show, a series of low resolution and high resolution images may begin to be downloaded onto the user's device. Pressing the icon 101 triggers a flow to create a video clip, starting with the current video frame (which may be the end point if the user decides to rewind and choose an earlier frame to be the start point of the video clip). If the user does not prefer to choose the currently displayed video frame, the user may decide to swipe on the screen to cause other frames of the television show to be displayed. Regardless of the frame selected, the user pressing the icon 101 will initiate the process of generating a video clip of the television show.

Figure 1B:
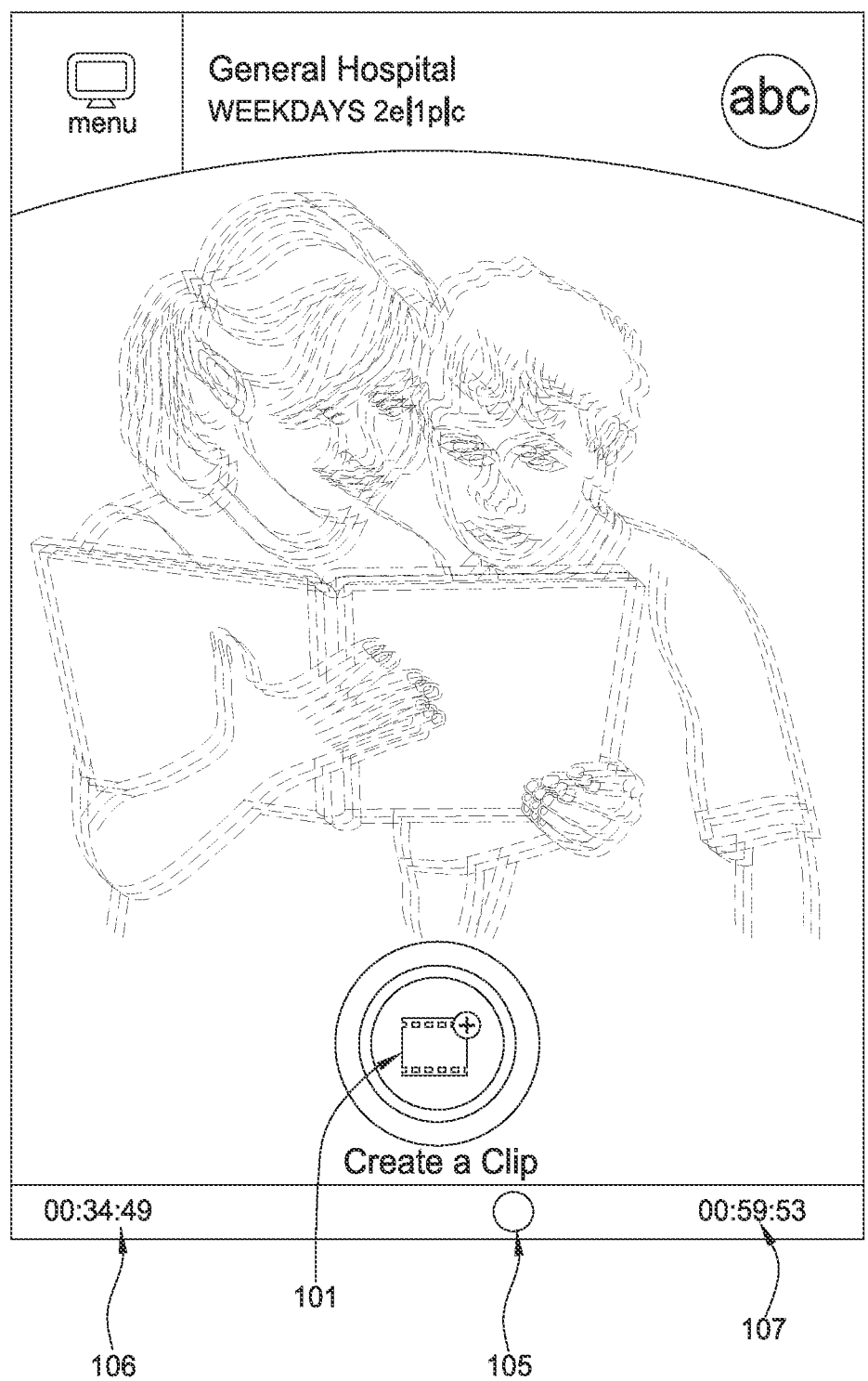

FIG. 1B is a schematic 100 illustrating gesture based video clipping control, according to one embodiment disclosed herein. In FIG. 1B, the user has already selected the icon 101, at the frame depicted in FIG. 1A, corresponding to 00:00:32 (32 seconds) into the television show. Additionally, the user has swiped using a number of fingers in a direction on the touch screen. If the user swipes from left to right, it may trigger a fast forward. If the user swipes from right to left, it may trigger a rewind. In another embodiment, these directions may be swapped, such that a left to right swipe triggers a rewind, and a right to left swipe triggers a fast forward. In the embodiment depicted in FIG. 4B, the user has swiped to trigger a fast forward, as the current time 106 now indicates that the time of the television show is 34 minutes and 49 seconds. The progress indicator 105 has been updated to reflect the progress through the television show, as it is more than half way across the screen, corresponding to the progress through more than half of the television show. To trigger a fast forward or rewind, the user's swipe must exceed a predefined minimum swipe threshold. For example, a configurable variable may specify that a swipe must exceed 25% of the screen width to trigger a fast forward or a rewind; any swipe not meeting this length will not trigger a fast forward or rewind.

The displayed frame of the television show is one of a subset of frames that will be displayed to the user while fast forwarding or rewinding. The subset of frames may be in a lower resolution that the start frame and destination frames, to conserve bandwidth, and allow for downloading of higher resolution start and destination frames. The subset of frames is determined by an interval, which is based on the number of fingers used. For example, a one-finger swipe could play every fourth video frame, a two-finger swipe could play every eighth video frame, and a three-finger swipe could take the user to the very first or last video frame, depending on the direction of the swipe. A destination frame may be the last video frame of the subset of frames, which may be computed based on the intervals and a number of video frames (or amount of time) to pass through during the rewind or fast forward. The interval values used may be any value sufficient to define intervals of video frames, such as two, three, four, and so on. The particular values used should not be considered limiting of the disclosure, as any values may be used. Users may set their own preferred values for the intervals and speed by which they are shown.

Additionally, a "fast swipe" may be defined to increase the intervals. A fast swipe may be a swipe that exceeds a predefined, configurable fast swipe threshold, such as 50% of the screen, or speed of the swipe. For example, if the swipe exceeds 50% of the width of the screen, the swipe may be considered a fast swipe, and the intervals increased accordingly. Or, if a speed of the swipe exceeds a predefined number of pixels per second, the swipe may be considered a fast swipe, and the intervals increased accordingly. The fast swipe may, for example, increase the intervals by a constant amount, such as doubling or quadrupling the intervals. Therefore, using the examples above, a one-finger fast swipe may include every eighth video frame, and a two-finger fast swipe could include every sixteenth frame, respectively, in the subset of frames displayed while fast forwarding or rewinding. Still yet, a speed of the fast forwarding or rewinding may be determined by calculating a time difference since the last swipe received and a distance from the last swipe position (measured in frames from the last position). The velocity may then be calculated to be the distance divided by the time difference, such that the velocity slows while nearing the end of the subset of frames.

Figure 1C:
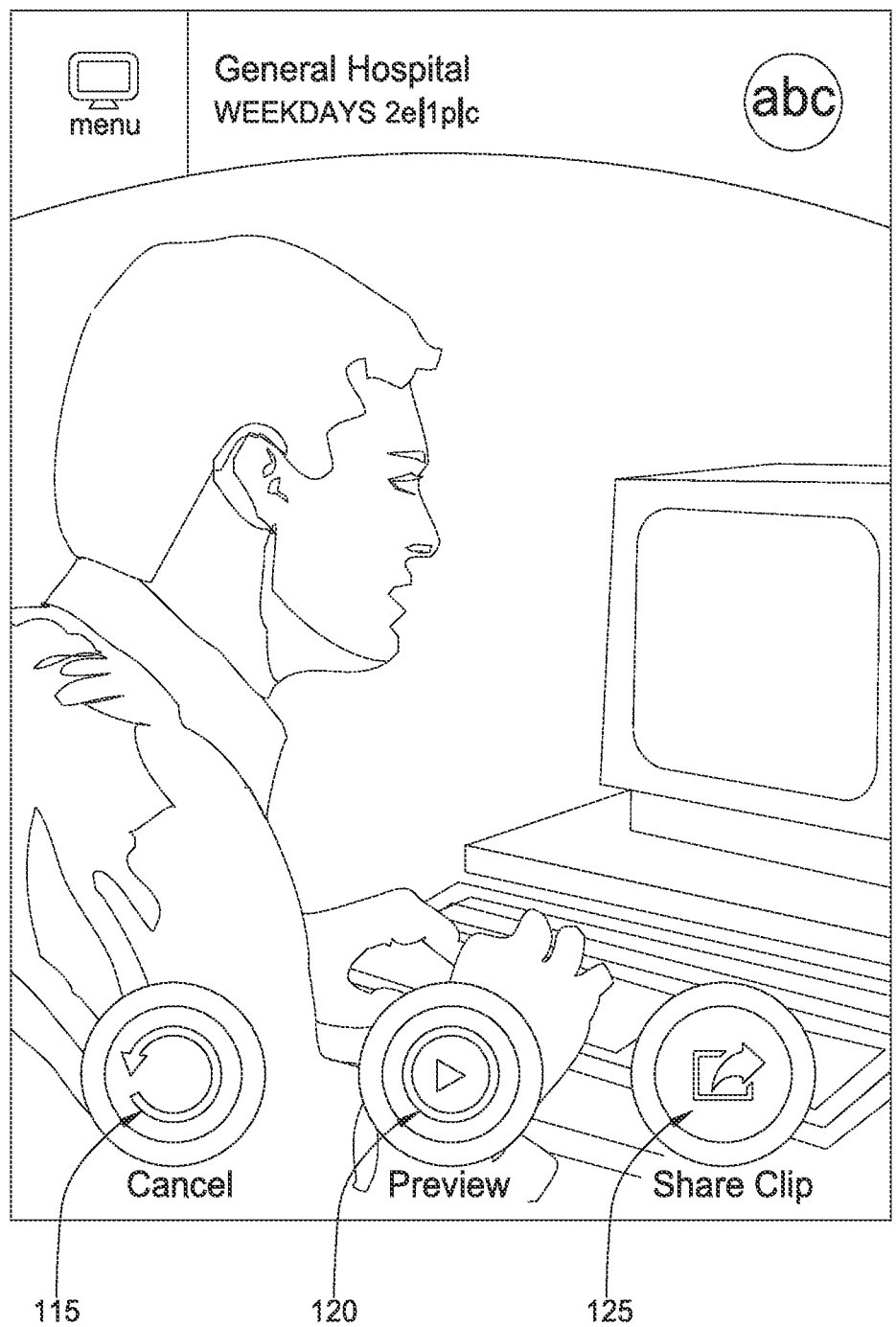

FIG. 1C is a schematic 100 illustrating gesture based video clipping control, according to one embodiment disclosed herein. FIG. 1C reflects the state where a user has selected the first frame as the start of the video clip. In this state, three user input buttons are available. The user can swipe through the video control to fast forward or rewind through the subset of frames to find the end point of the video clip. When the user finds the end point, a high resolution image marking second frame is now displayed on the touch screen device. As shown, cancel input 115 allows a user to cancel the generation of the video clip. Preview input 120 allows the user to preview the video clip generated using the provided start and end points. Share input 125 allows the user to share the generated clip through a number of means, including, but not limited to, email, text messaging, and social media sites.

Once the user selects two frames, a start frame and an end frame, the information regarding these frames may be sent to a server storing the video file of the television show. The server may then decide whether the user can generate the clip based on but not limited to the following reasons: whether the user has permissions to generate the clip, whether the user has available storage space to store the generated clip and whether the video clip meets the business and legal rules. The clip may then be stored in a storage location in the cloud, on the server, or on the user's device. The user may then watch the created clip at his or her leisure.

Figure 2:
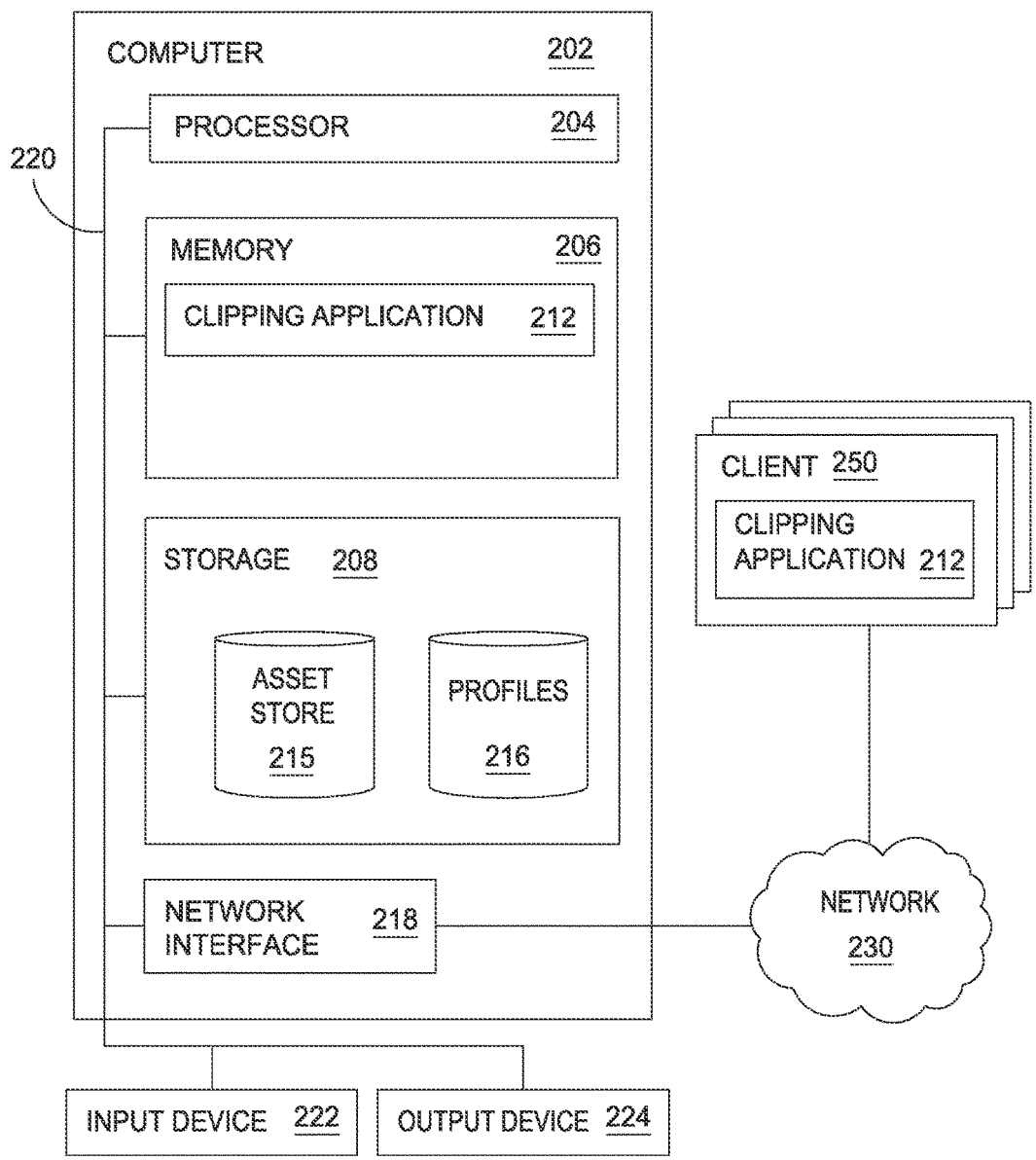
FIG. 2 is a block diagram illustrating a system for gesture based video clipping control, according to one embodiment disclosed herein.

FIG. 2 is a block diagram illustrating a system 200 for gesture based video clipping control, according to one embodiment disclosed herein. The networked system 200 includes a computer 202. The computer 202 may also be connected to other computers, including a plurality of client computers 250, via a network 230. The client computers 250 may have touch-screen displays configured to receive touch input from a user. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. Similarly, the memory 206 may be a random access memory. While the memory 206 is shown as a single identity, it should be understood that the memory 206 may comprise a plurality of modules, and that the memory 206 may exist at multiple levels, from high speed registers and caches to lower speed but larger DRAM chips. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used. Additionally, the input device 222 may comprise gesture-based input devices.

As shown, the memory 206 contains the clipping application 212, which is an application generally configured to create clips of media content files. The clipping application 212 may execute on the computer 201 as well as the client 250. The clipping application 212 may present a user with a first high resolution frame, and a touch screen input control to trigger the clipping of the media content file. The media content file may be of any suitable media format, including but not limited to, video, audio, or electronic book files. For illustration purposes only, the clipping application 212 will be discussed in terms of creating a video clip from a video file, such as a digital version of a live television show, a movie, or a prerecorded program. The clipping application 212 may also allow a user to scroll through different selected frames, or a subset of frames, of the media content files, to determine a start and end point for a clip to be generated. Once the user selects the touch screen input, the clipping application 212 may mark a start point (or end point) for the clip to be generated. The user may then input swiping motions using the touch screen display on his device to cause the clipping application 212 to fast forward or rewind through the subset of frames. The frames outputted for display to the user by the clipping application 212 while fast forwarding or rewinding may be in a lower resolution than a frame displayed while not fast forwarding or rewinding. A clip generated by the clipping application 212 will be of higher resolution than the frames displayed during fast forwarding or rewinding.

The clipping application 212 may also compare a length of a swipe entered by a user on the touch screen display to determine whether the swipe exceeds a predefined minimum swipe length threshold, which may be configured by the user, and is used to determine whether the user swiped far enough to trigger a fast forward or rewind. The clipping application 212 may also be configured to detect a number of fingers the user uses to create a swipe input. The clipping application 212, in detecting a number of fingers used to create the swipe input, may increase a speed of a fast forward or rewind as more fingers are used. For example, a one finger swipe may display every fourth video frame for a predetermined number of frames, such as 10. In such an event, the one finger swipe would bring the user 40 seconds past (or behind) the current frame being displayed. A two finger swipe may be every sixth video frame, for 15 seconds, resulting in a fast forward or rewind of 90 seconds. A three finger swipe may take the user to the first or last frame of the video. Any suitable values may be used to define swipe intervals and length, and a user may store their preferences in the profiles 216, described in greater detail below. The clipping application 212 may also provide a "fast swipe," which is triggered when the user's swipe exceeds a predefined fast swipe threshold. When triggered, the clipping application 212 may increase the speed of a one or two finger swipe by a multiple such as 2, 4, or 6, although any suitable value may be used.

The clipping application 212 may also control the speed at which the subset of frames are displayed to the user while fast forwarding or rewinding, based on a distance difference from the last swipe entered by the user, and a time difference from the last swipe entered by the user.

When a user has inputted the start and end points of the desired video clip, the clipping application 212 may then send the values to a remote server executing a version of the clipping application 212, which may then create the video clip using the desired start and end points. The clipping application 212 on the user's device may also perform a background download of the high and low resolution images to be displayed on the user's device.

As shown, storage 208 contains an asset store 215, which stores different media files, including, but not limited to, television shows, movies, videos, audio files, and electronic book files or meta-data for the media files. The media files in the asset store may be parsed and indexed by the clipping application 212 to create indices of the files, which may be stored in the asset store 215. The clipping application 212, in processing the media files or the meta-data of the media files, permits for an easier generation and retrieval of intervals and subsets of frames while the user is fast forwarding and rewinding. For example, if all video files require a subset of frames that include frames at four second intervals, an overall subset of these frames may be generated or downloaded from a remote server and stored in the asset store 215. If the program is a live television program, the asset store 215 may include the meta-data of the incoming video data, which is presented to the user by the clipping application 212 with the most recent frame first, who then has the option to rewind to the beginning of the program, or fast forward to the most recent frame, if a sufficient amount of time has passed for a new interval frame to have been added to the subset of frames.

As shown, the storage 208 also includes a profiles 216, which may include a plurality of settings for the clipping application 212. For example, default intervals, speeds, fast forward and rewind definitions for each number of fingers used, minimum swipe distance thresholds, and fast swipe distance thresholds. Additionally, users may have the option to define any of these values, which may be stored in a unique user profile for each user in the profiles 216. The profiles 216 may also include user data quotas, which the user must stay under in order to be able to create new video clips. Additionally, the profiles 216 may include digital rights management (DRM) tokens, which must be passed with the start and end points to the clipping application 212 in order to generate the video clip. Although depicted as a database, the profiles 216 and asset store 215 may take any form sufficient to store data, including text files, xml data files, and the like.

Figure 3:
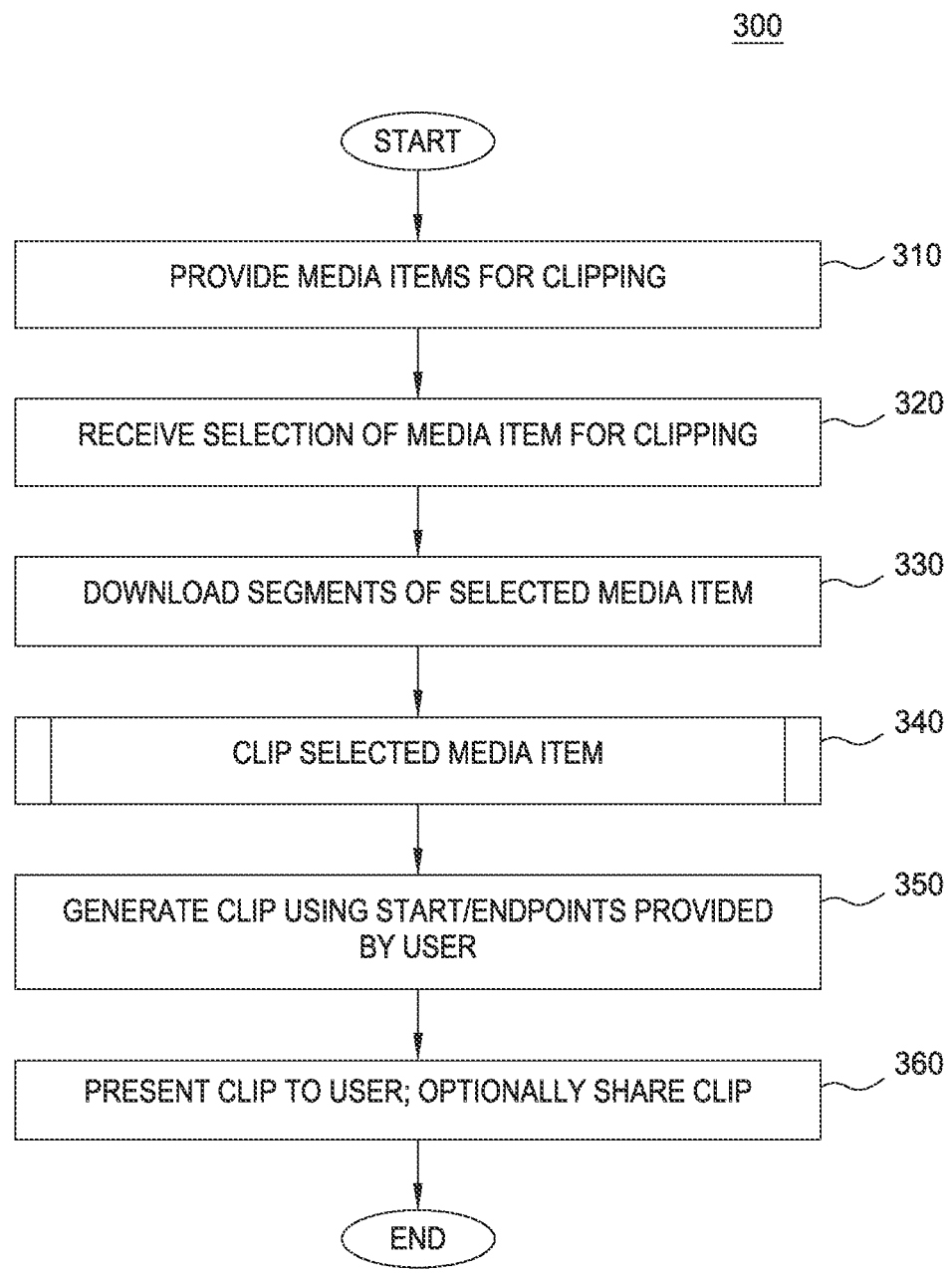
FIG. 3 is a flow chart illustrating a method for gesture based video clipping control, according to one embodiment disclosed herein.

FIG. 3 is a flow chart illustrating a method 300 for gesture based video clipping control, according to one embodiment disclosed herein. Generally, the steps of the method 300 allow a user to create a media clip from a media file. In one embodiment, the media file is a video, and the media clip is a video clip of the media file. In one embodiment, the video clip may be created while the user is watching all frames of the video. In one embodiment, the steps of the method 300 are performed by the clipping application 212.

At step 310, the clipping application 212 provides the user with a plurality of media items, such as videos, for clipping. The media files may be stored in the asset store 215. At step 320, the clipping application 212 receives user selection of a media item for clipping. At step 330, the clipping application 212 may begin downloading segments of the selected media item, which has been parsed, indexed, and stored in the asset store 215. A predefined subset of segments (frames, for example, in the video context) may be defined and retrieved based on the intervals defined in the profiles 216. For example, 64 low resolution frames around the currently presented frame may be queued, to allow for smooth fast forwarding and rewinding. The first frame presented to the user may vary based on the type of media file. If the media file is a live video program, the most recent frame may be displayed to the user. If the media file is a pre-recorded video file, the first frame may be displayed to the user.

At step 340, discussed in greater detail with reference to FIG. 4, the clipping application 212 clips the selected media item responsive to user input specifying to create the video clip. Generally, the step 340 comprises displaying a plurality of frames, or a subset of frames, of the video, and receiving user input marking a start frame and an end frame (which may be received in any order, depending on whether the user fast forwards or rewinds after triggering the clipping application 120). At step 350, the clipping application 212 generates the clip using the start and end points selected by the user. In one embodiment, the video is generated on a server remote from the user's device. At step 360, the clip is presented to the user on his or her mobile device. The user may also have the option to share the clip through a number of different means, such as email, messaging, and social media.

Figure 4:
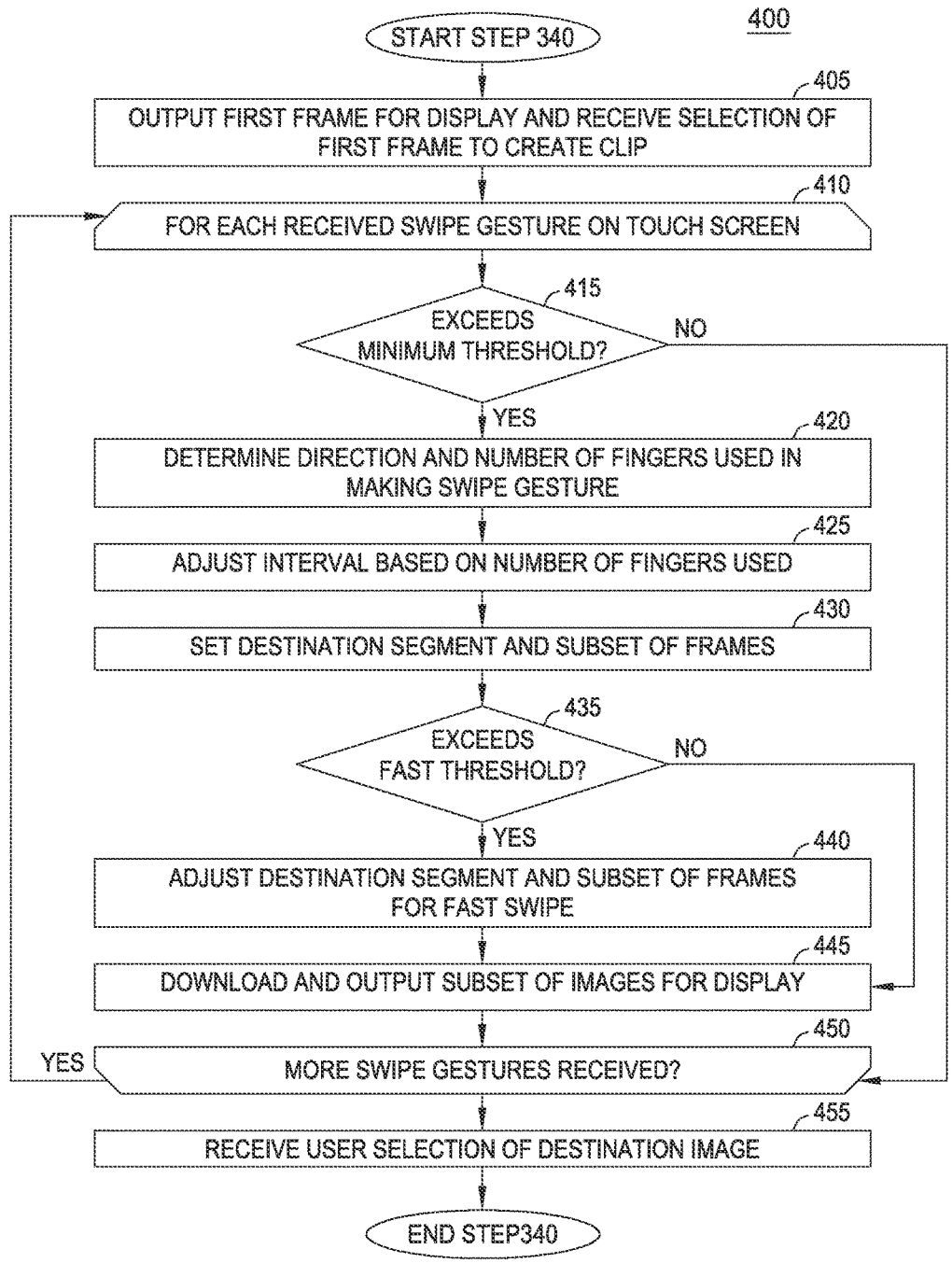
FIG. 4 is a flow chart illustrating a method to clip a video using gesture based video clipping control, according to one embodiment disclosed herein.

FIG. 4 is a flow chart illustrating a method 400 corresponding to step 340 to clip a video using gesture based video clipping control, according to one embodiment disclosed herein. In one embodiment, the clipping application 212 performs the steps of the method 400. At step 405, the clipping application 212 outputs the first frame for display on the user's device, and receives selection of the first frame to create the video clip. The first clip may be selected by the clipping application 212 based on any number of criteria, including but not limited to selecting the first frame of a pre-recorded video, the most recent frame of a live program, or randomly selecting a frame. Additionally, the user may opt to select a different frame than the first frame as the start point or end point of the clipped video. In such a case, the steps of the method 400 related to fast forwarding and rewinding video frames apply equally to present another high resolution frame which may be selected as the start point.

At step 310, the clipping application 212 begins executing a loop including steps 415-450 for each swipe gesture received on the touch screen. The swipes may indicate that the user wishes to fast forward or rewind through the frames of video. However, not all swipes registered on the touch screen device should trigger a fast forward or rewind. Therefore, at step 415, the clipping application 212 determines whether the length of the received swipe exceeds a minimum swipe threshold. The threshold may be expressed as a number of pixels, or a percentage of the screen. If the swipe does not exceed the threshold, the fast forwarding and rewinding is not triggered, and the clipping application 212 proceeds to step 450. Otherwise, a fast forward or rewind is triggered, and the clipping application 212 proceeds to step 420. At step 420, the clipping application 212 determines a direction of the swipe and a number of fingers used in making the swipe gesture. The direction is used to determine whether a fast forward or rewind is triggered. The number of fingers used affects the intervals and destination of the fast forward or rewind.

At step 310, the clipping application 212 begins executing a loop including steps 415-450 for each swipe gesture received on the touch screen. The swipes may indicate that the user wishes to fast forward or rewind through the frames of video. However, not all swipes registered on the touch screen device should trigger a fast forward or rewind. Therefore, at step 415, the clipping application 212 determines whether the length of the received swipe exceeds a minimum swipe threshold. The threshold may be expressed as a number of pixels, or a percentage of the screen. If the swipe does not exceed the threshold, the fast forwarding and rewinding is not triggered, and the clipping application 212 proceeds to step 450. Otherwise, a fast forward or rewind is triggered, and the clipping application 212 proceeds to step 420. At step 420, the clipping application 212 determines a direction of the swipe, the velocity of the swipe and a number of fingers used in making the swipe gesture. The direction is used to determine whether a fast forward or rewind is triggered. The velocity of the swipe is used to determine the scroll path of the video frames. The number of fingers used affects the intervals and destination of the fast forward or rewind.

At step 435, the clipping application 212 determines whether the swipe exceeds a fast swipe threshold. The fast swipe threshold may correspond to a number of pixels on the touch screen, or a percentage of the screen width, or any suitable threshold. For example, a fast swipe may be triggered if the user swipes more than 50% of the screen width. If the swipe does not exceed the fast swipe threshold, the clipping application 212 proceeds to step 445. If a fast swipe was registered, the clipping application 212 proceeds to step 440, where the clipping application 212 adjusts the destination segment/frame and the subset of frames to account for the fast swipe. For example, the fast swipe may double the speed of a fast forward or rewind, in which case, the destination frame is adjusted, and the intervals between frames in the subset of frames is doubled. At step 445, the clipping application 212 downloads the frames in the subset of frames, which may be at a lower resolution than a frame outputted for display when a fast forward or rewind is not in progress. In another embodiment, the frames have been pre-downloaded to the user's device.

Additionally, when fast forwarding or rewinding, a default speed may be defined in which the frames are displayed, or the frames may be displayed corresponding to a predefined display algorithm. If a high resolution image is available for the currently displayed frame, it may be displayed in place of the low resolution display. If neither the low resolution frame nor the high resolution frame is available, i.e., it has not been downloaded, a placeholder image may be used. The clipping application 212 may also calculate a velocity for displaying the frames in the subset of frames. For example, the clipping application 212 may calculate a time difference since the last scroll event and a distance difference (based on the number of frames) since the last scroll event. The velocity may then be calculated as the distance difference divided by the time difference, for any given frame in the subset of frames. The last frame displayed in the subset of frames, i.e., the destination frame, may be displayed in a higher resolution than the lower resolution frames.

At step 450, the clipping application 212 determines whether more swipe gestures have been received (i.e., in the event a user does not select a frame and decides to continue fast forwarding or rewinding). If more swipe gestures are received, the clipping application 212 returns to step 410. Otherwise, the clipping application 212 proceeds to step 455. At step 455, the clipping application 212 receives user selection of the destination, which is set as the end point (or start point) for the clipped video. Alternatively, the user may have selected a low resolution video frame which was being displayed during the fast forward or rewind process. Regardless of the frame selected, the clipping application 212 may now transmit the start and end point information to the server, which verifies that the user can create the clip. If creation of the clip is approved, the user may preview the clip, save the clip, or share it with friends. At this point, the method 400 ends.

Advantageously, embodiments disclosed herein provide for a more intuitive fast forward and rewind process while navigating through media using a gesture based input device. The speed and distance traveled through a media item may be affected based on the velocity of the swipe and how many fingers the user uses in making a swipe gesture. These advantages may also be beneficial while the user is creating a video clip of a live or pre-recorded television show or movie.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method to generate a clip of a media file on a device having a touch input component, the media file comprising a plurality of segments, the method comprising:
    outputting for display a first segment of the media file;
    responsive to receiving an input indicating to generate the clip of the media file using the first segment, storing an indication that the first segment comprises one of two endpoints for the clip, wherein the two endpoints comprise a starting endpoint for the clip and an ending endpoint for the clip, wherein the stored indication does not specify whether the first segment comprises the starting endpoint or the ending endpoint for the clip;
    responsive to receiving a first swipe gesture on the touch input component:
        identifying a first subset of segments, of the plurality of segments, based on a direction of the first swipe gesture and a time interval determined based on a number of fingers used to create the first swipe gesture, wherein the first subset of segments includes a destination segment, wherein the plurality of segments are defined in an index file specifying metadata for the media file;
        receiving, via a network, the destination segment at a first resolution specified in the index file and the remaining segments in the first subset of segments at a second resolution specified in the index file, wherein the second resolution is less than the first resolution, wherein receiving the remaining segments in the first subset at the second resolution as opposed to the first resolution relatively reduces an amount of data received by the device via the network; and outputting for display each segment of the first subset of segments in sequence; and responsive to receiving an input selecting the destination segment as part of the clip of the media file:

upon determining the direction of the first swipe gesture corresponds to a rewind gesture:

defining: (i) the first segment as the ending endpoint, and (ii) the destination segment as the starting endpoint; and upon determining the direction of the first swipe gesture corresponds to a fast forward gesture:

defining: (i) the first segment as the starting endpoint, and (ii) the destination segment as the ending endpoint;

generating the clip of the media file by operation of one or more computer processors, wherein the clip includes each segment of the media file between the first segment and the destination segment; and providing the generated clip of the media file to the device.

2. The method of claim 1, wherein the ending endpoint occurs at a later point in time in the media file than the starting endpoint, wherein using a first number of fingers to create the first swipe is associated with a first time interval, wherein using a second number of fingers to create the swipe is associated with a second time interval, wherein the first number of fingers is greater than the second number of fingers, wherein the first time interval is a greater amount of time than the second time interval, the method further comprising:

generating the index file by processing the plurality of segments of the media file, wherein the time interval is further determined based on a default time interval specified in the index file.

3. The method of claim 2, wherein each of the segments in the first subset of segments are outputted in sequence at a respective rate of speed, wherein the rate of speed for each segment is based on a number of segments that have been outputted since the first swipe gesture divided by an amount of time that has elapsed since the first swipe gesture, the method further comprising as a condition to outputting for display each of the first subset of segments:

determining that the first swipe gesture exceeds a gesture length threshold, wherein the gesture length threshold specifies a minimum gesture length on the display required to output each of the first subset of segments for display.

4. The method of claim 3, wherein a count of the number of segments in the first subset of segments is increased upon determining that the first swipe gesture exceeds at least one of: (i) a fast swipe gesture length, and (ii) a fast swipe gesture speed.

5. The method of claim 4, wherein outputting for display each segment of the first subset of segments in sequence comprises individually outputting each segment of the first subset of segments, wherein only one segment of the first subset of segments is outputted for display at a given time, wherein the first subset of segments is further based on a predefined segment count specifying a number of segments to be selected as part of the first subset of segments, wherein generating the clip of the media file comprises:

transmitting, to a remote server storing the media file, an indication: (i) that the first segment is the first one of the starting and ending endpoints, and (ii) that the destination segment is the second one of the starting and ending endpoints;

determining that a user requesting to generate the clip has permission to generate the clip; and storing the generated clip on at least one of: (i) the server, and (ii) the device.

6. The method of claim 5, wherein a second segment, of the plurality of segments, is not outputted for display, wherein the second segment is between the first segment and the destination segment, wherein the second segment is not included in the specified number of segments.

7. The method of claim 6, wherein the touch input component is one of: (i) a touch screen display, and (ii) a touch pad, wherein the media file is one of: (i) a video file, (ii) an e-book, and (iii) an audio file.

8. The method of claim 7, wherein the media file is a video file.

9. The method of claim 8, further comprising:

prior to receiving an input selecting the destination segment, receiving a second swipe gesture on the touch input component;

identifying, based on the index file, a second subset of segments based on a direction of the second swipe gesture;

setting a second destination segment as the destination segment; and outputting for display each of the second subset of segments in sequence.

10. A computer program product to generate a clip of a media file on a device having a touch input component, the media file comprising a plurality of segments, the computer program product comprising:

a non-transitory computer-readable medium having computer-readable program code embodied therewith, the computer-readable program code executable by one or more computer processors to perform an operation comprising:

outputting for display a first segment of the media file;

responsive to receiving an input indicating to generate the clip of the media file using the first segment, storing an indication that the first segment comprises one of two endpoints for the clip, wherein the two endpoints comprise a starting endpoint for the clip and an ending endpoint for the clip, wherein the stored indication does not specify whether the first segment comprises the starting endpoint or the ending endpoint for the clip; responsive to receiving a first swipe gesture on the touch input component:

identifying a first subset of segments, of the plurality of segments, based on a direction of the first swipe gesture and a time interval determined based on a number of fingers used to create the first swipe gesture, wherein the first subset of segments includes a destination segment, wherein the plurality of segments are defined in an index file specifying metadata for the media file;

receiving, via a network, the destination segment at a first resolution specified in the index file and the remaining segments in the first subset of segments at a second resolution specified in the index file, wherein the second resolution is less than the first resolution, wherein receiving the remaining segments in the first subset at the second resolution as opposed to the first resolution relatively reduces an amount of data received by the device via the network; and outputting for display each segment of the first subset of segments in sequence; and responsive to receiving an input selecting the destination segment as part of the clip of the media file:

upon determining the direction of the first swipe gesture corresponds to a rewind gesture:

defining: (i) the first segment as the ending endpoint, and (ii) the destination segment as the starting endpoint; and upon determining the direction of the first swipe gesture corresponds to a fast forward gesture:

defining: (i) the first segment as the starting endpoint, and (ii) the destination segment as the ending endpoint; and generating the clip of the media file, wherein the clip includes each segment of the media file between the first segment and the destination segment; and providing the generated clip of the media file to the device.

11. The computer program product of claim 10, wherein the ending endpoint occurs at a later point in time in the media file than the starting endpoint, wherein using a first number of fingers to create the first swipe is associated with a first time interval, wherein using a second number of fingers to create the swipe is associated with a second time interval, wherein the first number of fingers is greater than the second number of fingers, wherein the first time interval is a greater amount of time than the second time interval, the operation further comprising:

generating the index file by processing the plurality of segments of the media file, wherein the time interval is further determined based on a default time interval specified in the index file.

12. The computer program product of claim 11, wherein each of the segments in the first subset of segments are outputted in sequence at a respective rate of speed, wherein the rate of speed for each segment is based on a number of segments that have been outputted since the first swipe gesture divided by an amount of time that has elapsed since the first swipe gesture, the operation further comprising as a condition to outputting for display each of the first subset of segments:

determining that the first swipe gesture exceeds a gesture length threshold, wherein the gesture length threshold specifies a minimum gesture length on the display required to output each of the first subset of segments for display.

13. The computer program product of claim 12, wherein a count of the number of segments in the first subset of segments is increased upon determining that the first swipe gesture exceeds at least one of: (i) a fast swipe gesture length, and (ii) a fast swipe gesture speed.

14. The computer program product of claim 13, wherein outputting for display each segment of the first subset of segments in sequence comprises individually outputting each segment of the first subset of segments, wherein only one segment of the first subset of segments is outputted for display at a given time, wherein the first subset of segments is further based on a predefined segment count specifying a number of segments to be selected as part of the first subset of segments, wherein generating the clip of the media file comprises:

transmitting, to a remote server storing the media file, an indication: (i) that the first segment is the first one of the starting and ending endpoints, and (ii) that the destination segment is the second one of the starting and ending endpoints;

determining that a user requesting to generate the clip has permission to generate the clip; and storing the generated clip on at least one of: (i) the server, and (ii) the device.

15. The computer program product of claim 14, wherein a second segment, of the plurality of segments, is not outputted for display, wherein the second segment is between the first segment and the destination segment, wherein the second segment is not included in the specified number of segments.

16. The computer program product of claim 15, wherein the touch input component is one of: (i) a touch screen display, and (ii) a touch pad, wherein the media file is one of: (i) a video file, (ii) an e-book, and (iii) an audio file.

17. The computer program product of claim 16, wherein the media file is a video file.

18. The computer program product of claim 17, the operation further comprising:

prior to receiving input selecting the destination segment, receiving a second swipe gesture on the touch input component;

identifying, based on the index file, a second subset of segments based on a direction of the second swipe gesture;

setting a second destination segment as the destination segment; and outputting for display each of the second subset of segments in sequence.

19. A system, comprising:

one or more computer processors; and a memory containing a program which, when executed by the one or more computer processors, performs an operation to generate a clip of a media file on a device having a touch input component, the media file comprising a plurality of segments, the operation comprising:

outputting for display a first segment of the media file;

responsive to receiving an input indicating to generate the clip of the media file using the first segment, storing an indication that the first segment comprises one of two endpoints for the clip, wherein the two endpoints comprise a starting endpoint for the clip and an ending endpoint for the clip, wherein the stored indication does not specify whether the first segment comprises the starting endpoint or the ending endpoint for the clip; responsive to receiving a first swipe gesture on the touch input component:

identifying a first subset of segments, of the plurality of segments, based on a direction of the first swipe gesture and a time interval determined based on a number of fingers used to create the first swipe gesture, wherein the first subset of segments includes a destination segment, wherein the plurality of segments are defined in an index file specifying metadata for the media file;

receiving, via a network, the destination segment at a first resolution specified in the index file and the remaining segments in the first subset of segments at a second resolution specified in the index file, wherein the second resolution is less than the first resolution, wherein receiving the remaining segments in the first subset at the second resolution as opposed to the first resolution relatively reduces an amount of data received by the device via the network; and outputting for display each segment of the first subset of segments in sequence; and responsive to receiving an input selecting the destination segment as part of the clip of the media file:

upon determining the direction of the first swipe gesture corresponds to a rewind gesture:

defining: (i) the first segment as the ending endpoint, and (ii) the destination segment as the starting endpoint; and upon determining the direction of the first swipe gesture corresponds to a fast forward gesture:

defining: (i) the first segment as the starting endpoint, and (ii) the destination segment as the ending endpoint; and generating the clip of the media file, wherein the clip includes each segment of the media file between the first segment and the destination segment; and providing the generated clip of the media file to the device.

20. The system of claim 19, wherein the ending endpoint occurs at a later point in time in the media file than the starting endpoint, wherein using a first number of fingers to create the first swipe is associated with a first time interval, wherein using a second number of fingers to create the swipe is associated with a second time interval, wherein the first number of fingers is greater than the second number of fingers, wherein the first time interval is a greater amount of time than the second time interval, the operation further comprising:

generating the index file by processing the plurality of segments of the media file, wherein the time interval is further determined based on a default time interval specified in the index file.

21. The system of claim 20, wherein each of the segments in the first subset of segments are outputted in sequence at a respective rate of speed, wherein the rate of speed for each segment is based on a number of segments that have been outputted since the first swipe gesture divided by an amount of time that has elapsed since the first swipe gesture, the operation further comprising as a condition to outputting for display each of the first subset of segments:

determining that the first swipe gesture exceeds a gesture length threshold, wherein the gesture length threshold specifies a minimum gesture length on the display required to output each of the first subset of segments for display.

22. The system of claim 21, wherein a count of the number of segments in the first subset of segments is increased upon determining that the first swipe gesture exceeds at least one of: (i) a fast swipe gesture length, and (ii) a fast swipe gesture speed.

23. The system of claim 22, wherein outputting for display each segment of the first subset of segments in sequence comprises individually outputting each segment of the first subset of segments, wherein only one segment of the first subset of segments is outputted for display at a given time, wherein the first subset of segments is further based on a predefined segment count specifying a number of segments to be selected as part of the first subset of segments, wherein generating the clip of the media file comprises:

transmitting, to a remote server storing the media file, an indication: (i) that the first segment is the first one of the starting and ending endpoints, and (ii) that the destination segment is the second one of the starting and ending endpoints;

determining that a user requesting to generate the clip has permission to generate the clip; and storing the generated clip on at least one of: (i) the server, and (ii) the device.

24. The system of claim 23, wherein a second segment, of the plurality of segments, is not outputted for display, wherein the second segment is between the first segment and the destination segment, wherein the second segment is not included in the specified number of segments.

25. The system of claim 24, wherein the touch input component is one of: (i) a touch screen display, and (ii) a touch pad, wherein the media file is one of: (i) a video file, (ii) an e-book, and (iii) an audio file.

26. The system of claim 25, wherein the media file is a video file.

27. The system of claim 26, the operation further comprising:

prior to receiving an input selecting the destination segment, receiving a second swipe gesture on the touch input component;

identifying, based on the index file, a second subset of segments based on a direction of the second swipe gesture;

setting a second destination segment as the destination segment; and outputting for display each of the second subset of segments in sequence.

* * * * *